Sept. 7, 1926. 1,598,976
H. J. McGRAIL
JOINT BETWEEN VEHICLE TOPS AND WINDSHIELDS
Filed June 23, 1923

Inventor
Hugh J. McGrail
By his Attorneys
Blackmore, Spencer & Flint

Patented Sept. 7, 1926.

1,598,976

UNITED STATES PATENT OFFICE.

HUGH J. McGRAIL, OF FLINT, MICHIGAN, ASSIGNOR TO GENERAL MOTORS CORPORATION, OF DETROIT, MICHIGAN, A CORPORATION OF DELAWARE.

JOINT BETWEEN VEHICLE TOPS AND WINDSHIELDS.

Application filed June 23, 1923. Serial No. 647,280.

This invention relates to vehicles and is illustrated as embodied in an automobile having an improved wind-tight joint between the top and windshield. An object of the invention is to provide a joint of this character of a pleasing finished appearance which will not interfere with manipulation of the windshield, and which will have no overlapping flaps or other expensive special joint members, and will not interfere with a windshield wiper or other implement mounted on the windshield.

From this point of view the invention may be regarded as comprising a joint between the top and the top edge of the windshield which includes a member, herein referred to as a top visor panel, which is held yieldingly compressed against the top edge of the windshield and which is secured to the top. In a preferred form this member is carried by the front bow, if the top is collapsible, and extends rearwardly over the top edge of the windshield and is provided with yielding material which is compressed against the windshield. The material may be held so compressed by any suitable means such as the usual clamps which fasten the front bow and the windshield together at opposite sides.

This top visor panel carried by the front bow is preferably a resilient piece of sheet metal having a channel as described, but may be of wood if desired, and I prefer that the channel be filled with yielding material retained in place by an encircling flexible cover. However, a joint which is satisfactory from most points of view can be secured by omitting the yielding material and displacing the flexible cover into the channel, as permitted by its elasticity.

The above and other objects and features of the invention, including various novel combinations of parts and desirable particular constructions, will be apparent from the following description of three illustrative embodiments of my invention shown in the accompanying drawings, in which.

Figure 1:
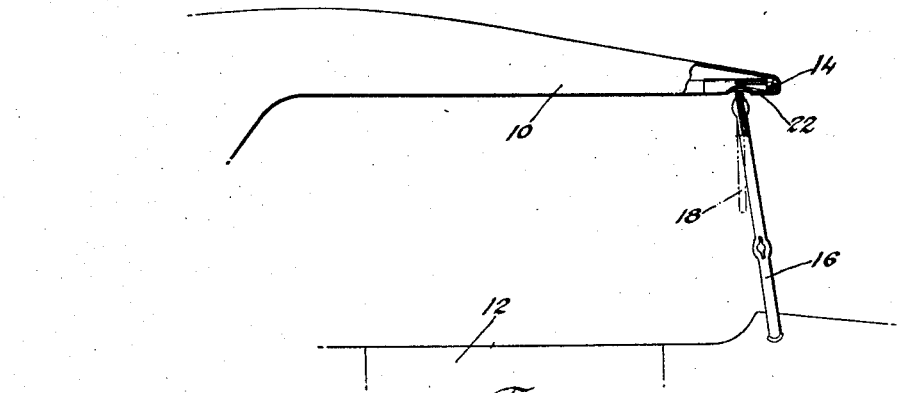
Figure 1 is a side elevation of part of an automobile showing my improved visor panel in its assembled relation.
Figure 2:
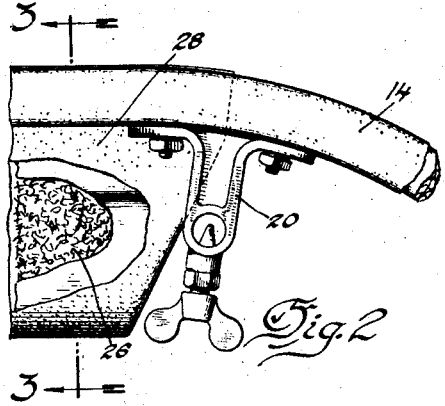
Figure 2 is a partial bottom plan view of the panel and the front bow of the top, partly broken away.
Figure 3:
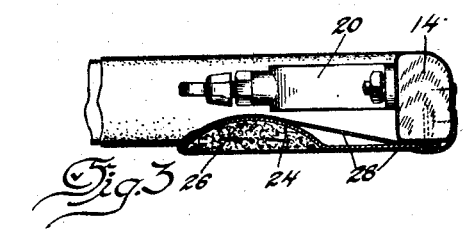
Figure 3 is a section on the line 3—3 of Figure 2 showing the panel in vertical section.

In the form shown in Figures 1, 2 and 3, the top 10 of an automobile 12 is provided with a front bow 14 which normally comes just above and in front of the top of a windshield 16, which may have a swinging upper panel 18. The front bow 14 is provided at its opposite sides with clamps 20 for receiving and holding the ends of the side posts of the windshield 16. The clamps 20 hold the top 10 and the windshield 16 securely together.

In order to provide a wind-tight joint between the top 10 and the top panel 18 of the windshield 16, my invention contemplates the use of an improved top visor panel 22 which, in the form shown in Figures 1, 2 and 3 comprises a metal piece 24 bent to provide a transverse channel or concavity which may be filled with cotton or other wadding 26 and which is encircled by an elastic fabric cover 28 which confines the wadding in place and which adds a finished appearance to the panel. The fabric 28 may be an imitation leather matching the material of the top 10. The channel of the metal piece 24 comes immediately above the top edge of the panel 18 of the windshield, and is arranged so that the top edge of the windshield panel is forced into the channel, compressing the wadding 26 in a manner permitted by the elasticity of the cover 28. By this arrangement, although there is no interference with swinging the panel 18 back and forth, and although there are no unsightly flaps or fastenings of any sort, there is an absolutely wind-tight joint between the top bow 14 and the top of the windshield. The elimination of flaps and other obstructions also facilitates mounting a windshield wiper on the top edge of the windshield as is highly desirable with many types of wipers.

Figure 4:
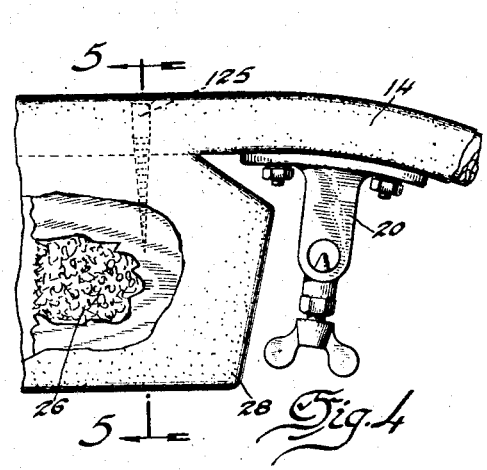
Figure 4 is a view corresponding to Figure 2 but showing a modified form of panel.
Figure 5:
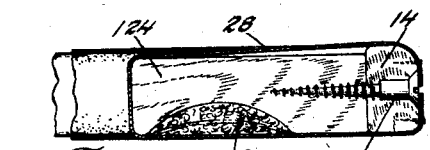
Figure 5 is a section on the line 5—5 of Figure 4, and corresponding to Figure 3, but showing the second modification.

The panel shown in Figures 4 and 5 differs from that shown in Figures 1, 2 and 3 in that the piece 124, corresponding to the metal piece 24, is of wood fastened to the front bow 14 by screws 125 and channeled on its lower face to provide for the wadding 26. The panel is encircled by the fabric cover 28 as described above, and forms the same kind of a joint with the top of the windshield.

Figure 6:
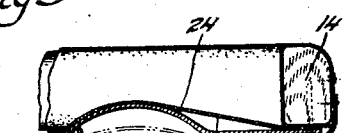
Figure 6 is a view corresponding to Figures 3 and 5 but showing a third modification.

The modified panel shown in Figure 6 is the same as the one shown in Figures 1, 2 and 3 except that the wadding 26 is omitted, and the elasticity of the fabric covering 28 is relied upon to secure a tight joint with the top of the windshield by its displacement into the concave or channel portion of the metal piece 24.

While several illustrative embodiments of my invention have been described in detail it is not my intention to limit its scope to those particular embodiments or otherwise than by the terms of the appended claims.

I claim:

1. A vehicle comprising, in combination, a top having a front bow, a windshield with its top edge adjacent said bow, a substantially rigid visor member carried by the bow and extending over the top edge of the windshield, and yielding means in the body of said visor compressed by the visor member against the top edge of the windshield to provide a wind-tight joint.

2. A vehicle comprising, in combination, a top, a windshield, clamps for securing the top and windshield together at opposite sides, and a substantially rigid and padded visor member carried by the top and compressed against the top edge of the windshield to provide a wind-tight joint and held under compression by said clamps.

3. A vehicle comprising, in combination, a top having a front bow, a windshield having its top edge adjacent said bow, a visor panel carried by the bow which has a transverse channel parallel to and immediately above the top edge of the windshield, and yielding packing material carried by the visor panel and compressible into said channel by the top edge of the windshield to provide a wind-tight joint.

4. A vehicle comprising, in combination, a top having a front bow, a windshield having its top edge adjacent said bow, a visor panel carried by the bow and having a transverse channel immediately above and parallel to the top edge of the windshield, yielding material secured in the channel which is compressible against the top edge of the windshield to provide a wind-tight joint and means for securing the top and the windshield together with the material compressed by the top edge of the windshield.

5. A vehicle comprising, in combination, a top having a front bow, a windshield arranged with its top edge adjacent said bow, a resilient visor panel carried by the bow and having a transverse channel parallel to and immediately above the top edge of the windshield, and yielding material compressible into the channel by the top edge of the windshield to provide a wind-tight joint.

6. A top visor panel having a portion to be secured to the front bow of a top and a transverse channel to be arranged above the top edge of a windshield, and a flexible cover surrounding the panel and displaceable into the channel by the top edge of a windshield.

7. A top visor panel having a portion to be secured to the front bow of a top and a transverse channel to be arranged above the top edge of a windshield, yielding material in said channel, and a flexible cover surrounding the panel and the yielding material to provide a finished appearance and hold the yielding material in the channel.

8. A top visor panel of sheet metal bent to have a portion to be secured to the front bow of a top and a transverse channel at the rear of said flat portion, yielding compressible material filling said channel, and a flexible cover encircling the panel and the yielding material to provide a finished appearance and to hold the yielding material in the channel.

9. A top visor panel having a portion to be secured to the front bow of a top and a transverse channel immediately at the rear of said flat portion, and an elastic fabric cover encircling the panel and displaceable into the channel by the top edge of a windshield to provide a wind-tight joint therewith.

10. A vehicle comprising, in combination, a top having a front bow, a windshield having a swinging upper panel with its axis near its top edge, a visor panel carried by the front bow and extending over the top edge of the swinging panel of the windshield and having a transverse channel immediately above said top edge, material yieldingly displaceable into said channel by the top edge of the swinging panel of the windshield without interfering substantially with swinging said windshield panel, and means for holding the top and windshield together.

In testimony whereof I affix my signature.

HUGH J. McGRAIL.